Patented Oct. 30, 1945

2,388,154

UNITED STATES PATENT OFFICE 2,388,154

AMIDES

Morris Katzman, Chicago, Ill., assignor to The Emulsol Corporation, Chicago, Ill.

No Drawing. Application August 2, 1941,
Serial No. 405,221

20 Claims. (Cl. 260—404.5)

This invention relates to new chemical compounds which are characterized by possessing interface modifying properties rendering the same highly useful for the purposes for which such agents are employed in the various arts.

While, in many instances, the novel compounds are best defined in the form of reaction products of stated materials, at least most of them may be considered as falling within the scope of the general formula

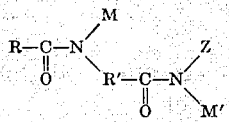

wherein

is an acyl radical containing at least four carbon atoms and preferably from eight to eighteen carbon atoms, M is hydrogen, alkyl (including cycloalkyl), hydroxy-alkyl or hydroxy-aryl,

is the acyl residue of a carboxylic acid, Z is hydrogen, alkyl (including cycloalkyl), hydroxy-alkyl or hydroxy-aryl, and M' is hydrogen, alkyl (including cycloalkyl), hydroxy-alkyl or hydroxy-aryl, at least one of M, Z or M' being hydroxy-alkyl or hydroxy-aryl.

A more limited aspect and preferred embodiment of the compounds of the invention may be represented by the general formula

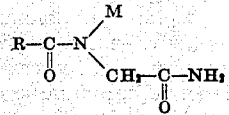

wherein

is a fatty acid acyl radical containing from eight to eighteen carbon atoms, and M is hydroxy-alkyl.

In order that the nature of the invention may become apparent, there are listed hereinbelow representative compounds which fall within the scope of the invention:

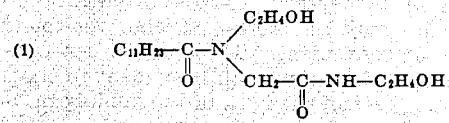

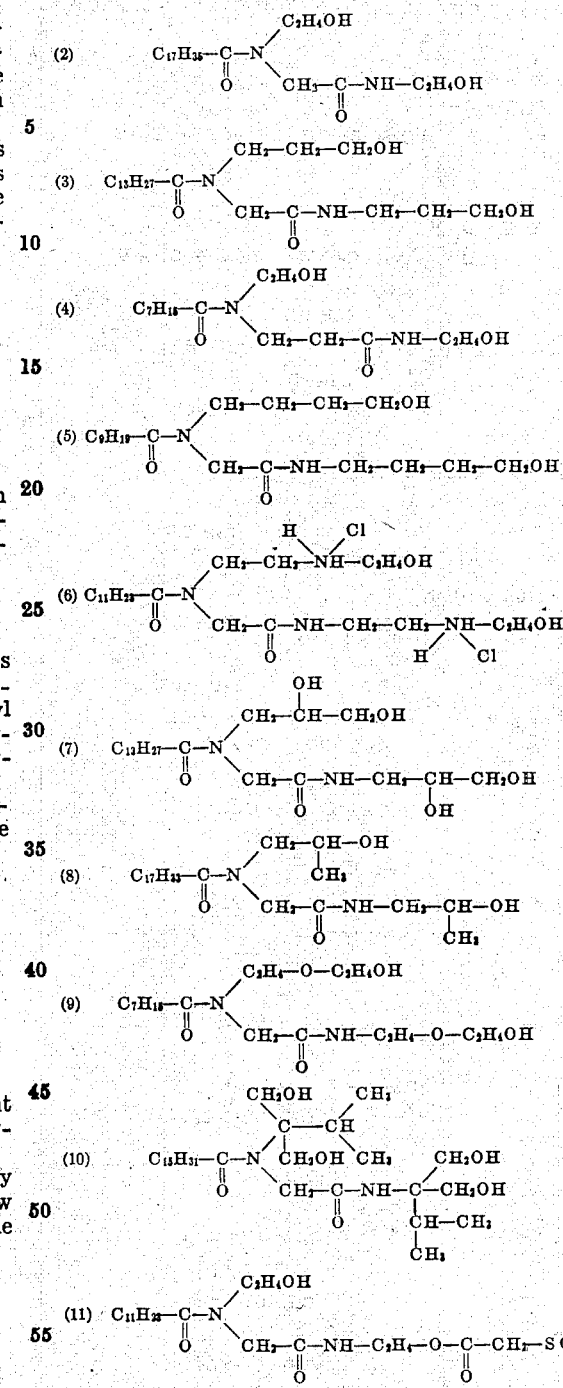

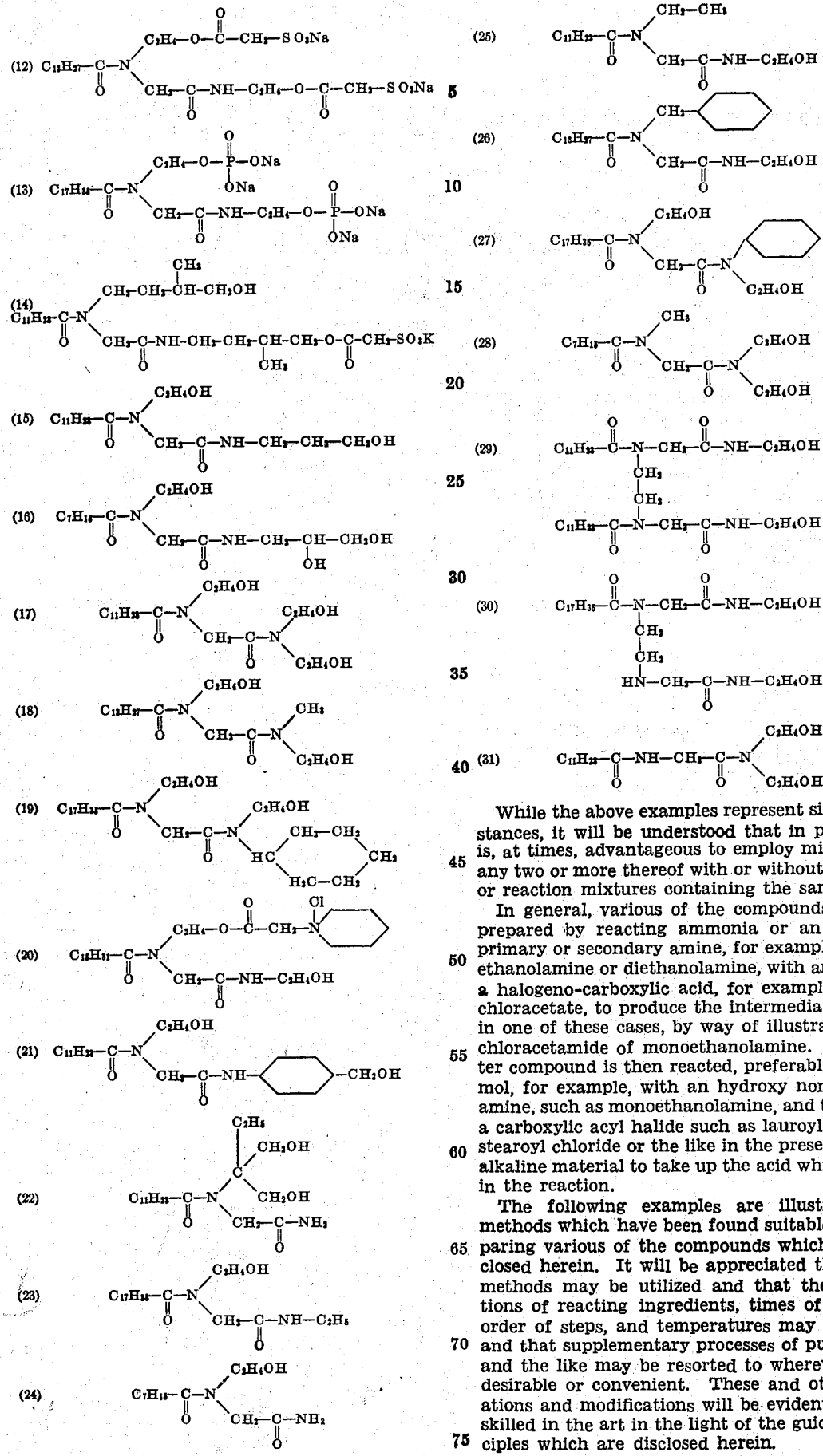

While the above examples represent single substances, it will be understood that in practice it is, at times, advantageous to employ mixtures of any two or more thereof with or without diluents, or reaction mixtures containing the same.

In general, various of the compounds may be prepared by reacting ammonia or an hydroxy primary or secondary amine, for example, monoethanolamine or diethanolamine, with an ester of a halogeno-carboxylic acid, for example, methyl chloracetate, to produce the intermediate amide, in one of these cases, by way of illustration, the chloracetamide of monoethanolamine. The latter compound is then reacted, preferably mol for mol, for example, with an hydroxy non-tertiary amine, such as monoethanolamine, and then with a carboxylic acyl halide such as lauroyl chloride, stearoyl chloride or the like in the presence of an alkaline material to take up the acid which forms in the reaction.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A (1) 145 grams of the chloracetamide of monoethanolamine and 145 cc. of water were admixed together and to the mixture was added a solution of 62 grams of monoethanolamine dissolved in 240 cc. of water. The mixture was maintained at a temperature of about 25 degrees C. to 30 degrees C for about two hours in a cold water bath. The mixture was then heated at 80 degrees C. for about 3–4 hours. The reaction mixture was then allowed to cool to approximately 50 degrees C. whereupon 25.6 grams of NaOH dissolved in 75 cc. of water were added, the resulting mixture then being heated to 60 degrees C. and maintained at that temperature for approximately one hour. The resulting reaction product consisted primarily of a mixture of the following compound and the hydrochloric acid salt of the same:

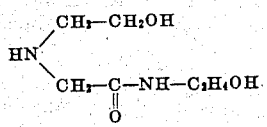

The entire reaction product was then diluted with water to make 600 grams and aliquots thereof were used for subsequent reactions.

(2) To 264 grams of the solution produced in part (1) hereof, there were added dropwise, with stirring, 21.8 grams of lauroyl chloride and, simultaneously, there were added dropwise 2.64 grams of NaOH dissolved in 184 cc. of water. The reaction product was then made up to a weight of 500 grams by the addition of water. The final product was a thin, white paste containing predominantly a compound having the following formula:

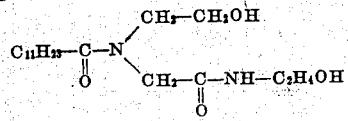

The product had good foaming and wetting characteristics, 0.2% of the active material wetting out in 23 seconds in the Draves test.

Example B

To 198 grams of the solution produced in part (1) of Example A, maintained at about 25 degrees C., there were added 4 grams of NaOH dissolved in 154 cc. of water and there were also added, dropwise and with stirring, 25 grams of the acyl chloride of coconut oil mixed fatty acids. The reaction product comprised a medium viscous milky-white emulsion containing approximately 10% of a compound having the following formula:

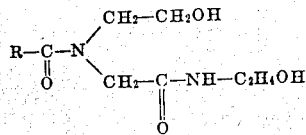

(wherein

is the acyl radical corresponding to the fatty acids present in coconut oil mixed fatty acids.)

The reaction product had good wetting and detergent characteristics and, in addition, it functioned as an effective thickener for aqueous solutions of detergents containing upwards of 5% of detergent material.

Example C (1) 89 grams of 2-amino-2-methyl-propanol-1 were admixed with 145 grams of the chloracetamide of monoethanolamine dissolved in 280 cc. of water and the resulting mixture was heated for approximately one hour at a temperature ranging from 30 degrees C. to about 76 degrees C. The reaction mixture was then cooled to approximately room temperature and 24 grams of NaOH flakes were added. After the NaOH was dissolved, the solution was warmed for approximately 4½ hours at a temperature of about 80 degrees C. The product was allowed to cool and then 16 grams of NaOH were added in order to free the amine. The reaction product comprised primarily a compound having the following formula:

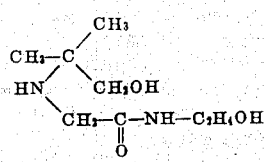

(2) 188 cc. of water were added to 159 grams of the solution resulting from part (1) hereof and there were added thereto, at a temperature of approximately 30 degrees C., dropwise and with stirring over a period of about 10 minutes, 22 grams of lauroyl chloride. The temperature rose to approximately 41 degrees C., the reaction being completed in a relatively short period of time. The reaction product was a milky-colored, jell-like emulsion containing approximately 10% of a compound having the following formula:

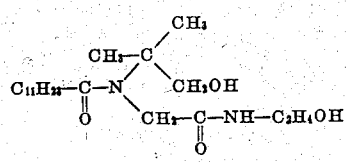

The product had good wetting and surface modifying characteristics. 0.2% of the active ingredient wetted out in 24 seconds using the Draves test.

Example D (1) To 340 grams of an aqueous solution containing approximately 57 grams of 2-amino-2-methyl-propanol-1 there were added slowly, with stirring, 24 grams of the acyl chloride of coconut oil mixed fatty acids, the addition taking place over a period of about 10 minutes, the temperature rising from room temperature to approximately 36 degrees C. Dilute hydrochloric acid was then added to neutralize the reaction product to methyl red. The product was then warmed to 80 degrees C. and allowed to stand until a good separation into two layers took place. The lower aqueous layer was drawn off and the upper oily layer was dried at 105 degrees C. for two hours. The final product was a light amber liquid when hot, solidifying, on cooling, to a wax-like solid. The product comprised primarily a compound having the following formula:

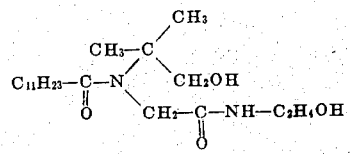

(2) 4 grams of the product produced in part (1) hereof and 2.3 grams of sulphophthalic anhydride

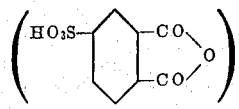

were admixed and warmed to 60 degrees C. and maintained at that temperature for about 10 minutes. The reaction mixture was then allowed to cool to room temperature, and 20 grams of crushed ice were added thereto and mixed well therewith and then 0.5 N NaOH were added to render the reaction mixture neutral to phenolphthalein. The reaction product was a sulphophthalic acid ester of the compound of part (1) hereof. It produced water-clear solutions and had good foaming properties.

(3) 4 grams of the product produced in accordance with part (1) hereof and 4 grams of sulphoacetic acid were mixed together and warmed to a temperature of 60 degrees C.–70 degrees C. and maintained at that temperature for a period of one hour. The reaction mixture was then cooled to room temperature, hydrated with 20 grams of crushed ice and neutralized to litmus with 0.5 N KOH. The reaction mixture was a clear water-white solution, having good foaming properties, and contained a substantial proportion of a sulphoacetic acid ester of the compound produced in part (1) hereof. To the reaction mixture 150 cc. of boiling isopropyl alcohol were added, the mixture was cooled in an ice bath, and then filtered, the precipitate then being dried in a vacuum. It was a white crystalline substance having the formula

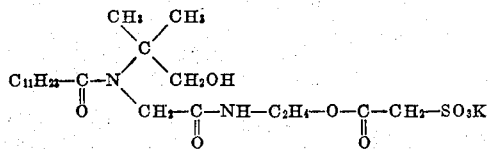

*Example E*

(1) 21 grams of chloracetamide

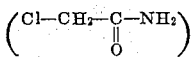

25.8 grams of 2-amino-2-ethyl-1,3-propanediol, and 50 cc. of water were heated to 70 degrees C. and allowed to stand for several hours. 4 grams of flaked sodium hydroxide were then added, with stirring, and the mixture was again heated up to 70 degrees C. An additional two grams of flaked sodium hydroxide were then added and the mixture was heated to 70 degrees C. over a period of about one hour. A final addition of two grams of flaked sodium hydroxide was made and the mixture was then heated, with stirring, up to 80 degrees C. for about one hour whereupon the reaction was substantially complete. The reaction product contained a compound having the following formula:

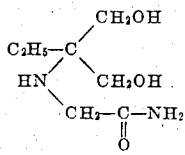

(2) To the reaction product of part (1) hereof, 9 grams of lauroyl chloride were added dropwise, with stirring. The reaction product was a cream colored paste containing approximately 15% of a compound having the following formula:

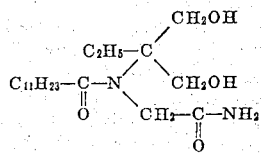

(3) 10 grams of the reaction mixture of part (2) hereof were mixed with 50 cc. of petroleum ether and the mixture was warmed up. Two layers were formed, the lower layer being drawn off and discarded. The upper petroleum ether layer was evaporated whereupon the resulting product was a light brown waxy material dispersible in water. It had good thickening properties for aqueous solutions containing several percent of synthetic detergents such as the ethanolamine salt of lauryl sulphoacetate, and the like.

*Example F*

(1) To 20 grams of chloracetamide dissolved in 50 cc. of methyl alcohol there were added 12.4 grams of monoethanolamine dissolved in 50 cc. of methyl alcohol. The mixture was warmed slowly up to 50 degrees C., 4 grams of flaked sodium hydroxide were added, with stirring, and after approximately 15 minutes 4 grams more of flaked sodium hydroxide were added. The reaction mixture was then heated, with stirring, to 60 degrees C. and the methyl alcohol was evaporated on the hot water bath and under vacuum. The reaction product, which was a cream colored liquid having a slight ammoniacal odor when hot, comprised a compound having the following formula:

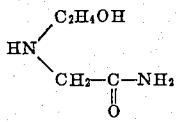

(2) To 11.8 grams of the reaction product of part (1), dissolved in 25 cc. of water, there were added dropwise, with vigorous stirring, 16 grams of the acyl chloride of caprylic acid and simultaneously therewith there was added dropwise a solution of 4 grams of sodium hydroxide in 25 cc. of water. The temperature rose from 28 degrees C. to 32 degrees C. The reaction mixture was a substantially clear, thin solution, the active portion of which had good wetting properties and comprised essentially a compound having the following formula:

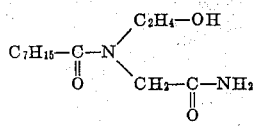

(3) 42 grams of the reaction mixture of part (2) hereof were evaporated to dryness. To the dry material, 50 grams of ethylene dichloride were added and the sodium chloride was filtered off from the mixture. There were then added slowly, with stirring, 6 grams of chlorsulphonic acid, the reaction mixture being cooled to about 5 degrees C. in an ice water bath. 25 grams of crushed ice were then added and the reaction mixture was neutralized to litmus with a solution of potassium hydroxide. The ethylene dichloride was then removed by evaporation. The final product was a light colored paste, clearly soluble in water, having good foaming and wetting properties, and consisting essentially of the compound having the following formula:

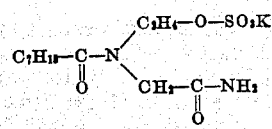

Example G (1) 29 grams of the chloracetamide of monoethanolamine and 28 grams of a 33.3% aqueous solution of ethyl amine were mixed together, the temperature rising to about 40 degrees C. over a period of 25 minutes. 4 grams of flaked sodium hydroxide were then added, with vigorous mixing, whereupon the temperature rose to about 67 degrees C. After allowing the mixture to stand for about 10 minutes, an additional 4 grams of flaked sodium hydroxide were added, with stirring, and, after about 15 minutes, the precipitated sodium chloride was filtered off. Thereupon 35 cc. of water were added to the filtrate.

(2) 50 grams of the reaction mixture of part (1) hereof were admixed with 11 grams of lauroyl chloride and 2 grams of sodium hydroxide dissolved in 100 cc. of water. The lauroyl chloride and the sodium hydroxide solution were added simultaneously and dropwise, with stirring, the temperature rising from about 37 degrees C. to 46 degrees C. The reaction mixture separated into two layers. The lower salt layer was drawn off and discarded and to the upper layer 130 cc. of distilled water were added. The product was a milky solution having foaming properties, the active portion of which comprised a compound having the following formula:

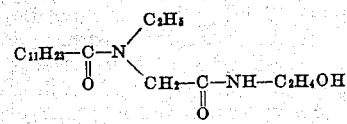

Example H (1) 22 grams of a 70% solution of ethylene diamine, 73 grams of the chloracetamide of monoethanolamine, and 105 cc. of distilled water were mixed together and allowed to stand for a period of 35 minutes, the temperature rising to a maximum of 80 degrees C. The mixture was then cooled to 45 degrees C. and 10 grams of flaked sodium hydroxide were then added, with stirring, and the mixture was then allowed to stand for several hours. Thereupon 10.5 grams of flaked sodium hydroxide were added, with stirring. The reaction product consisted essentially of a compound having the following formula:

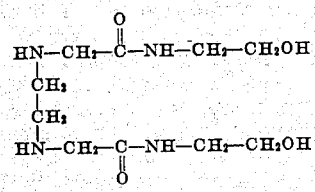

(2) To 44 grams of the reaction product of part (1) hereof, 10 grams of lauroyl chloride and 2 grams of sodium hydroxide dissolved in 154 cc. of water were simultaneously added, dropwise and with stirring, the temperature rising to 40 degrees C. during the reaction. The reaction product was a medium viscous milky emulsion on cooling. It contained a substantial proportion of the compound having the following formula:

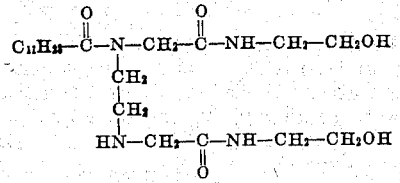

(3) To 44 grams of the reaction product of part (1) hereof, 20 grams of lauroyl chloride and 4 grams of sodium hydroxide dissolved in 200 cc. of water were simultaneously added, dropwise and with stirring. The temperature rose from about 28 degrees C. to 41 degrees C. during the reaction. The final product was a milk-white emulsion, the active ingredient of which had good emulsifying properties and comprised a product having the following formula:

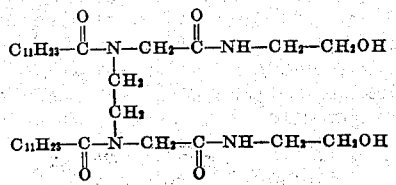

Example I (1) 50 grams of the chloracetamide of diethanolamine and 100 grams of ammonium carbonate dissolved in 200 cc. of water were heated at 60 degrees C. for about 30 minutes. The mixture was allowed to cool to 50 degrees C. whereupon 20 cc. of concentrated aqueous ammonia were added and the mixture was allowed to stand for approximately one hour. It was then heated up to about 70 degrees C. for approximately one hour at which time the reaction was largely completed as determined by chlorine analysis. The reaction mixture was then evaporated on a steam bath to a weight of 60 grams. In order to prepare the free base from the hydrochloride salt, 10.4 grams of sodium hydroxide dissolved in 50 cc. of water were added and the mixture was again evaporated on a steam bath to a weight of 60 grams. The reaction product was a light brown, viscous material. It comprised a compound having the following formula

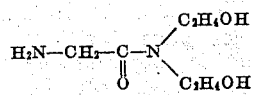

(2) The reaction product of part (1) hereof was dissolved in distilled water to make up a total of 200 grams. To 100 grams of said solution there were added simultaneously, dropwise and with stirring, one gram of sodium hydroxide and 5.4 grams of lauroyl chloride. The temperature rose from about 30 degrees C. to 41 degrees C. Enough water was then added to make the total 200 grams. The reaction product was a jell-like emulsion having a light brown color and contained a reaction product the active ingredient of which was a compound having the following formula:

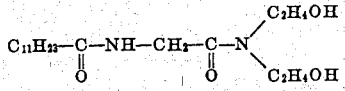

Example J (1) 19.6 grams of a 33.3% solution of ethyl amine, 50 cc. of water and 30 grams of the chloracetamide of diethanolamine were mixed together and heated to about 60 degrees C. over a period of about 1½ hours. The mixture was allowed to cool to about 53 degrees C. whereupon 3 grams of flaked sodium hydroxide were added thereto. The mixture was heated to about 60 degrees C. over a period of about 15 minutes, 3 grams more of flaked sodium hydroxide were added and the mass was allowed to stand for several hours. It was then diluted with water to make a total of 200 grams.

(2) To 100 grams of the reaction mixture of part (1) hereof, 5.4 grams of lauroyl chloride and one gram of sodium hydroxide dissolved in 10 cc. of water were simultaneously added, dropwise and with stirring, the temperature rising from about 30 degrees C. to 40 degrees C. The product separated into 2 layers and the lower layer was withdrawn and discarded. The upper layer was diluted with water to make a total of 200 grams. A slightly milky, generally translucent solution resulted, said solution containing about 9.3 grams of the compound having the following formula:

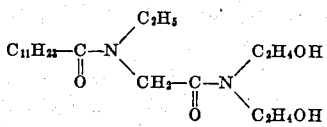

The acyl radical represented by

in the general formulae set forth hereinabove may be derived from the following carboxylic acids or their acylating derivatives such as anhydrides, esters, acyl halides and the like: straight chain and branched chain, saturated and unsaturated, carboxylic aliphatic (including cycloaliphatic), fatty, aromatic, hydroaromatic, and araliphatic acids including butyric acid, caproic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acids such as i-hydroxy stearic acid, dihydroxypalmitic acid, di-hydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxyaromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, halogen such as chlorine or bromine, ketone and other groups. Of particular utility are the unsubstituted fatty acids containing from twelve to eighteen carbon atoms and their acyl halides.

The hydroxy primary and secondary amines, or, in other words, hydroxy non-tertiary amines, which may be used in the preparation of the compounds of the present invention include, among others, symmetrical, unsymmetrical, normal and iso-derivatives, such as monoethanolamine, diethanolamine, monopropanolamine, dipropanolamine, monobutanolamine, mono-iso-butanolamine, dibutanolamine, monopentanolamine, dipentanolamine, monohexanolamine, dihexanolamine, mono-octanolamine, dioctanolamine, monodecylolamine, mono-laurylolamine, monohexadecylolamine, mono-octadecylolamine; hydroxylamine; arylolamines such as p-amino phenol and

HO—CH₂—⟨ ⟩—NH₂ mono-ethyl, mono-ethanol amine; mono-butyl, mono-ethanol amine; mono-cyclohexyl, mono-ethanol amine; alkylol polyamines such as alkylol derivatives of ethylene diamine, diethylene triamine, and triethylene tetra-amine as, for example, hydroxy-ethyl ethylene diamine; diglycerol mono-amine; diglycerol di-amine; hydroxy-amines derived from other polyhydric alcohols, including glycols, sugars and sugar alcohols such as ethylene glycol, diethylene glycol, dextrose, sucrose, sorbitol, mannitol and dulcitol; 1-amino-2,3-propanediol; 2-amino-1,3-propanediol; 2-amino-2-methyl-1,3-propanediol; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino-2-ethylol-1,3-propanediol; 2-amino-2-methyl-1,6-hexanediol; and 1-amino-1,1-dimethyl ethanol. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. Polymerized hydroxy non-tertiary amines prepared, for example, by polymerizing monoethanolamine, diethanolamine, or other hydroxy non-tertiary amines such as those mentioned hereinabove, particularly in the presence of a catalyst such as sodium hydroxide or the like, may also be employed. The preparation of polymerized hydroxy amines is disclosed, for example, in United States Patent No. 2,178,173. Homologues and substitution derivatives of the above-mentioned hydroxy amines may also be utilized. Because of commercial and other considerations, monoethanolamine is especially desirable. It will be understood that the hydroxy non-tertiary amines may be utilized in pure, impure or commercial form.

The halogeno-carboxylic acids or other derivatives thereof, preferably in the form of their esters with methyl alcohol or ethyl alcohol or the like, which are reacted with the hydroxy primary or secondary amines to form the intermediate halogeno-carboxylic acid amides of the hydroxy amines which are used in the reaction may be selected from a relatively large class including mono-, di- and poly-carboxylic derivatives as, for example, mono-chloracetic acid, mono-bromacetic acid, chloracetyl chloride, bromacetyl bromide, mono-iodoacetic acid, alpha-chlor propionic acid, alpha-brom propionyl bromide, alpha-chlor butyric acid, alpha-bromo capric acid, mono-chlor succinyl chloride, di-chlor succinyl chloride, mono-chlor succinic acid, di-chlor succinic acid, di-chlor glutaric acid, di-chlor glutaryl chloride, nitro-chloro-benzoyl chlorides, and the corresponding halogeno-derivatives of malonic acid, citraconic acid, mesaconic acid, itaconic acid, mucic acid, adipic acid, pimelic acid, sebacic acid, suberic acid, azelaic acid, aconitic acid, phthalic acid, and the like. It will be understood that the said acids serve as source materials for the acyl radical

in the general formula set out hereinabove. The intermediates and methods of preparing the same are disclosed in my copending applications Serial No. 309,575, filed December 16, 1939, now Patent No. 2,245,593, issued June 17, 1941, and Serial No. 346,806, filed July 22, 1940, now Patent No. 2,290,881, issued July 28, 1942.

As shown in Examples 11, 12, 13, 14 and 20, there are also included within the scope of the present invention derivatives such as those produced by the introduction of hydrophylic groups into the previously described compounds. These hydrophylic groups may be of varying character such as, for example, sulphonates, phosphates, pyrophosphates, tetraphosphates, metaphosphates, borates, sulphocarboxylic acid radicals containing not more than 8 carbon atoms and preferably from 2 to 4 carbon atoms, including, among others, sulphoacetate, sulphopropionate, sulphobutyrate, sulphosuccinate, sulphomaleate, sulphoglutarate, sulphomucate, sulphoadipate, sulphosebacate, sulphophthalate, sulphoaconitate, sulphobenzoate, and the like. Other hydrophylic groups may be introduced which contain, for example, nitrogen, and which tend to enhance the water-solubility or water-dispersibility of the compounds into which such radicals are introduced. It will be understood that either one or more of such hydrophile radicals may be introduced into the compounds.

In addition to, or independently of, the introduction of the aforementioned hydrophylic groups into the molecules of the compounds of the present invention, the latter may also have introduced thereinto alkyl or acyl groups to make ether or ester derivatives. Thus, for example, compounds such as those illustrated by Examples 1 and 2 may be reacted to produce esters with acetic acid, propionic acid or higher molecular weight carboxylic acids such as those derived from natural oils and fats as, for example, lauric acid, oleic acid, stearic acid, palmitic acid, myristic acid, and the like, or the acyl halides of such acids. Considering the compounds (1) and (2), for example, one of the free hydroxy groups may be esterified with a carboxylic acid or acyl halide of the character mentioned and another of the hydroxy groups may be reacted to introduce a hydrophile group as previously described. The introduction of the alkyl or acyl or hydrophile groups or both alkyl or acyl and hydrophile groups into the molecules of the compounds described herein results in the production of novel compounds having many interesting and useful interface modifying properties.

At least many of the compounds of the present invention may also be considered as derivatives of primary or secondary amino-carboxylic acids wherein the primary or secondary amino group is amidified with a carboxylic acid containing at least four and particularly at least eight carbon atoms, and wherein the carboxyl group of the amino-carboxylic acid is amidified with ammonia, hydroxylamine, or an alcohol primary or secondary amine, there being at least one hydroxy group and, in most cases, at least one hydroxy-alkyl or hydroxy-aryl radical linked directly to nitrogen. For example, compound (1) may be considered as being derived from glycine, wherein one of the hydrogens of the amino group is replaced by an hydroxy-ethyl radical ($C_2H_4OH$), the other of the hydrogens of the amino group of the glycine is replaced by the lauric acid acyl radical

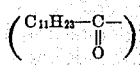

and the carboxylic group of the glycine is amidified with monoethanolamine.

The compounds of this invention have utility in various arts in which interface modifying agents are employed. They are resistant to precipitation by calcium and magnesium salts and are compatible with acid and alkali media. They may be utilized in washing and laundering and the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. They possess antiseptic, bactericidal and germicidal properties even when used in quite highly dilute aqueous solutions so that they are well adapted for medicinal and allied purposes. Another use to which the agents of the present invention may be placed is for the treatment of paper pulp and paper where they may be employed, for example, as penetrating agents in the cooking of the paper pulp or the like.

Their capillary or interfacial tension reducing properties enable them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present inventions may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophylic gums including pectin, tragacanth, karaya, locust bean, gelatin, arabic and the like; glue; vegetable, animal, fish and mineral oils; solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium sulphate, myristyl sodium pyrophosphate, cetyl sodium tetraphosphate, octyl sodium sulphate, oleyl sodium sulphate, and the like; higher fatty acid partial esters of aliphatic polyhydroxy substances such as monoglycerides, diglycerides and partial esters of polyglycerols, for example, mono-caprylin, monolaurin, mono-olein, di-olein, oleic and stearic acid mono-esters of polyglycerols; higher fatty acid mono-esters of glycols, such as lauric acid mono-ester of diethylene glycol; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulpho-succinate, dilauryl potassium sulpho-glutarate, lauryl monoethanolamine sulphoacetate, and the like; sulphuric and sulphonic derivatives of condensation products of alkylolamines and higher fatty acids; phosphoric, pyro- phosphoric and tetraphosphoric acid esters of higher molecular weight alcohols; Turkey-Red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employed with advantage herein, particularly in the light of the disclosures made hereinabove.

The term "higher," as used herein and in the claims to describe carboxylic and fatty acids and the like, will be understood to mean at least eight carbon atoms unless otherwise specifically stated.

While the invention has been described in detail, it is to be understood that the scope thereof is not to be limited other than is set forth in the claims.

This application is a continuation-in-part of my prior application, Serial No. 400,389, filed June 30, 1941, now Patent No. 2,303,366, issued December 1, 1942.

What I claim as new and desire to protect by Letters Patent of the United States is:

1. Chemical compounds corresponding to the formula

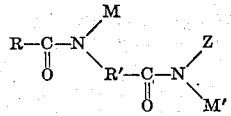

wherein

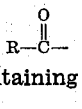

is an acyl radical containing at least 4 carbon atoms,

is the acyl residue of a carboxylic acid, M and M' are selected from the group consisting of hydrogen, alkyl, hydroxy-alkyl and hydroxy-aryl, and Z is selected from the group consisting of hydrogen, alkyl, hydroxy-alkyl and hydroxy-aryl, at least one of M, M' and Z being selected from the group consisting of hydroxy-alkyl and hydroxy-aryl.

2. Chemical compounds corresponding to the formula

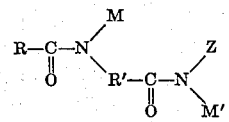

wherein

is an aliphatic acyl radical containing at least 8 carbon atoms,

is the acyl residue of an aliphatic carboxylic acid containing less than 8 carbon atoms, M and M' are selected from the group consisting of hydrogen, alkyl, hydroxy-alkyl and hydroxy-aryl, and Z is selected from the group consisting of hydrogen, alkyl, hydroxy-alkyl and hydroxy-aryl, at least one of M, M' and Z being selected from the group consisting of hydroxy-alkyl and hydroxy-aryl.

3. Chemical compounds corresponding to the formula

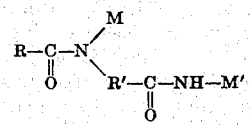

wherein

is a fatty acid acyl radical containing at least 8 carbon atoms, R' is an alkylene radical containing less than 8 carbon atoms, and M and M' are radicals selected from the group consisting of hydrogen, alkyl, hydroxy-alkyl and hydroxy-aryl radicals provided, however, that at least one of the radicals M and M' contains at least one hydroxy group.

4. Chemical compounds corresponding to the formula

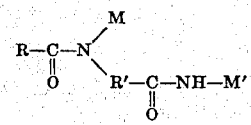

wherein

is a fatty acid acyl radical containing at least 8 carbon atoms, R' is an alkylene radical containing less than 8 carbon atoms, M is an alkyl radical containing less than 8 carbon atoms, and M' is an hydroxy-alkyl radical.

5. Chemical compounds corresponding to the formula

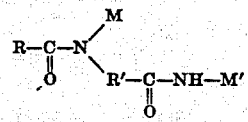

wherein

is a fatty acid acyl radical containing at least 8 carbon atoms, R' is an alkylene radical containing less than 8 carbon atoms, and M and M' are hydroxy-alkyl radicals.

6. Chemical compounds corresponding to the formula

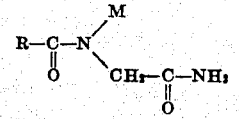

wherein

is a fatty acid acyl radical containing from 8 to 18 carbon atoms, and M is an hydroxy-alkyl radical.

7. Chemical compounds corresponding to the formula

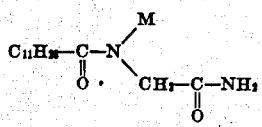

wherein

is a fatty acid acyl radical containing from 8 to 18 carbon atoms, and M is an hydroxy-alkyl radical.

8. Hydrophylic derivatives of chemical compounds corresponding to the following formula

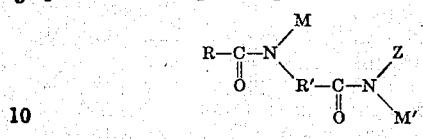

wherein

is an acyl radical containing at least 4 carbon atoms,

is the acyl residue of a carboxylic acid, M and M' are selected from the group consisting of hydrogen, alkyl, hydroxy-alkyl and hydroxy-aryl, and Z is selected from the group consisting of hydrogen, alkyl, hydroxy-alkyl and hydroxy-aryl, at least one of M, M' and Z being selected from the group consisting of hydroxy-alkyl and hydroxy-aryl radicals, the hydrophylic groups being linked at at least one of said last-mentioned radicals.

9. Hydrophylic derivatives of chemical compounds corresponding to the following formula

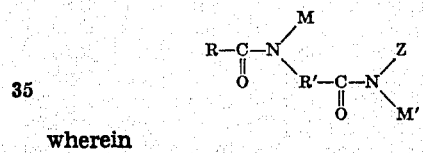

wherein

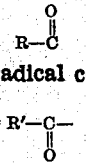

is a fatty acid acyl radical containing from 8 to 18 carbon atoms,

is an aliphatic acyl residue of a carboxylic acid containing less than 8 carbon atoms, M and M' are selected from the group consisting of hydrogen, alkyl, hydroxy-alkyl and hydroxy-aryl, and Z is selected from the group consisting of hydrogen, alkyl, hydroxy-alkyl and hydroxy-aryl, at least one of M, M' and Z being selected from the group consisting of hydroxy-alkyl and hydroxy-aryl, the hydrophylic groups being linked at at least one of the hydroxy-alkyl or hydroxy-aryl radicals.

10. Hydrophylic derivatives of chemical compounds corresponding to the following formula, the hydrophylic groups being ester-linked to an hydroxy group of the radical M':

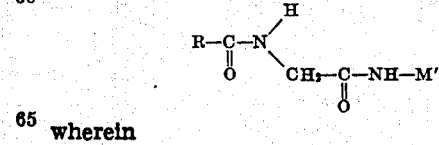

wherein

is a fatty acid acyl radical containing at least 8 carbon atoms, and M' is an hydroxy-alkyl radical.

11. The method of preparing new chemical compounds which comprises condensing a primary amine with a halogeno-carboxylic acid amide of a non-tertiary amine, in the presence of an alkaline material, and then reacting the resulting compound with a carboxylic acid acyl halide containing at least four carbon atoms to introduce the corresponding acyl radical into the molecule in the form of an amide linkage, there being at least one hydroxy-alkyl radical in the finished compound.

12. The method of preparing new chemical compounds which comprises condensing an hydroxy-alkyl primary amine with a halogeno-fatty acid amide of a non-tertiary aliphatic amine containing less than eight carbon atoms, and then reacting the resulting compound with a fatty acid acyl chloride containing from eight to eighteen carbon atoms to introduce the corresponding acyl radical into the molecule in the form of an amide linkage, there being at least one hydroxy-alkyl radical in the finished compounds.

13. The method of preparing new chemical compounds which comprises condensing an hydroxy-alkyl primary amine with an amide of an aliphatic carboxylic acid containing not more than 8 carbon atoms, and then reacting the resulting compound with an acyl chloride containing at least 8 carbon atoms to introduce the corresponding acyl radical into the molecule in the form of an amide linkage.

14. The method of preparing new chemical compounds which comprises condensing monoethanolamine with chloracetamide in the presence of an alkaline material, and then reacting the resulting compound with a fatty acid acyl chloride containing from eight to eighteen carbon atoms to introduce the corresponding acyl radical into the molecule in the form of an amide linkage.

15. Compounds in the form of non-tertiary amino carboxylic acids wherein the amino group is amidified with a carboxylic acid containing at least four carbon atoms, and wherein the carboxyl group of the amino-carboxylic acid is amidified with ammonia, there being at least one hydroxy group linked to nitrogen.

16. Compounds in the form of non-tertiary amino fatty acids wherein the amino group is amidified with a fatty acid containing from 8 to 18 carbon atoms, and wherein the carboxyl group of the amino-fatty acid is amidified with ammonia, there being at least one hydroxy-alkyl radical linked directly to nitrogen.

17. Compounds in the form of non-tertiary amino carboxylic acids wherein the amino group is amidified with a carboxylic acid containing at least four carbon atoms, and wherein the carboxyl group of the amino-carboxylic acid is amidified with an alcohol non-tertiary amine, there being at least one hydroxy group linked to nitrogen.

18. Compounds in the form of non-tertiary amino fatty acids wherein the amino group is amidified with a fatty acid containing from 8 to 18 carbon atoms, and wherein the carboxyl group of the amino-fatty acid is amidified with an alcohol non-tertiary amine, there being at least one hydroxyl-alkyl radical linked directly to nitrogen.

19. Chemical compounds corresponding to the formula

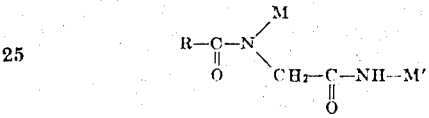

wherein

is a fatty acid acy radical containing from 8 to 18 carbon atoms, and M and M' are hydroxy-alkyl radicals.

20. The chemical compound corresponding to the formula

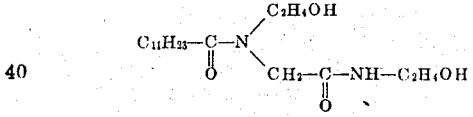

MORRIS KATZMAN.